United States Patent
Yi et al.

(10) Patent No.: US 10,165,418 B2
(45) Date of Patent: Dec. 25, 2018

(54) METHOD FOR TRANSMITTING A SIDELINK BUFFER STATUS REPORTING IN A D2D COMMUNICATION SYSTEM AND DEVICE THEREFOR

(71) Applicant: LG ELECTRONICS INC., Seoul (KR)

(72) Inventors: Seungjune Yi, Seoul (KR); Sunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 59 days.

(21) Appl. No.: 15/333,729

(22) Filed: Oct. 25, 2016

(65) Prior Publication Data

US 2017/0127251 A1    May 4, 2017

Related U.S. Application Data

(60) Provisional application No. 62/250,509, filed on Nov. 4, 2015.

(51) Int. Cl.
*H04W 4/08* (2009.01)
*H04W 76/40* (2018.01)
(Continued)

(52) U.S. Cl.
CPC .............. *H04W 4/08* (2013.01); *H04W 76/14* (2018.02); *H04W 76/40* (2018.02); *H04W 28/0278* (2013.01); *H04W 84/042* (2013.01)

(58) Field of Classification Search
CPC ....... H04W 4/08; H04W 76/14; H04W 76/40; H04W 84/042; H04W 28/0278
See application file for complete search history.

(56) References Cited

U.S. PATENT DOCUMENTS

| 2014/0023008 A1 | 1/2014 | Ahn et al. |
| 2015/0271846 A1 | 9/2015 | Kowalski et al. |

FOREIGN PATENT DOCUMENTS

| WO | 2015099321 | 7/2015 |
| WO | 2015163625 | 10/2015 |

OTHER PUBLICATIONS

PCT International Application No. PCT/KR2016/011727, Notification of Transmittal of the International Search Report and the Written Opinion of the International Searching Authority, or Declaration dated Feb. 3, 2017, 12 pages.

(Continued)

*Primary Examiner* — Kiet Tang
(74) *Attorney, Agent, or Firm* — Lee Hong Degerman Kang Waimey

(57) ABSTRACT

The present invention relates to a wireless communication system. More specifically, the present invention relates to a method and a device for transmitting a sidelink buffer status reporting in a D2D communication system, the method comprising: transmitting information related to a first destination information list including at least one groupcast destination ID and a second destination information list including at least one unicast destination ID; assigning values of destination index to groupcast destinations IDs in listing order in the first destination information list and remaining values of the destination index after setting to the groupcast destinations IDs to unicast destinations IDs in listing order in the second destination information list, sequentially; generating and transmitting a SL BSR MAC CE including at least one destination index field identifying at least one destination, when SL BSR is triggered.

14 Claims, 13 Drawing Sheets

(51) Int. Cl.
*H04W 76/14* (2018.01)
*H04W 28/02* (2009.01)
*H04W 84/04* (2009.01)

(56) References Cited

OTHER PUBLICATIONS

PCT International Application No. PCT/KR2016/011728, Notification of Transmittal of the International Search Report and the Written Opinion of the International Searching Authority, or Declaration dated Feb. 3, 2017, 11 pages.
Catt, "Construction of the Sidelink BSR MAC CE", R2-154052, 3GPP TSG RAN WG2 Meeting #91bis, Oct. 2015, 5 pages.
Samsung, "Sidelink BSR for Unicast", R2-154064, 3GPP TSG RAN WG2 Meeting #91bis, Oct. 2015, 3 pages.

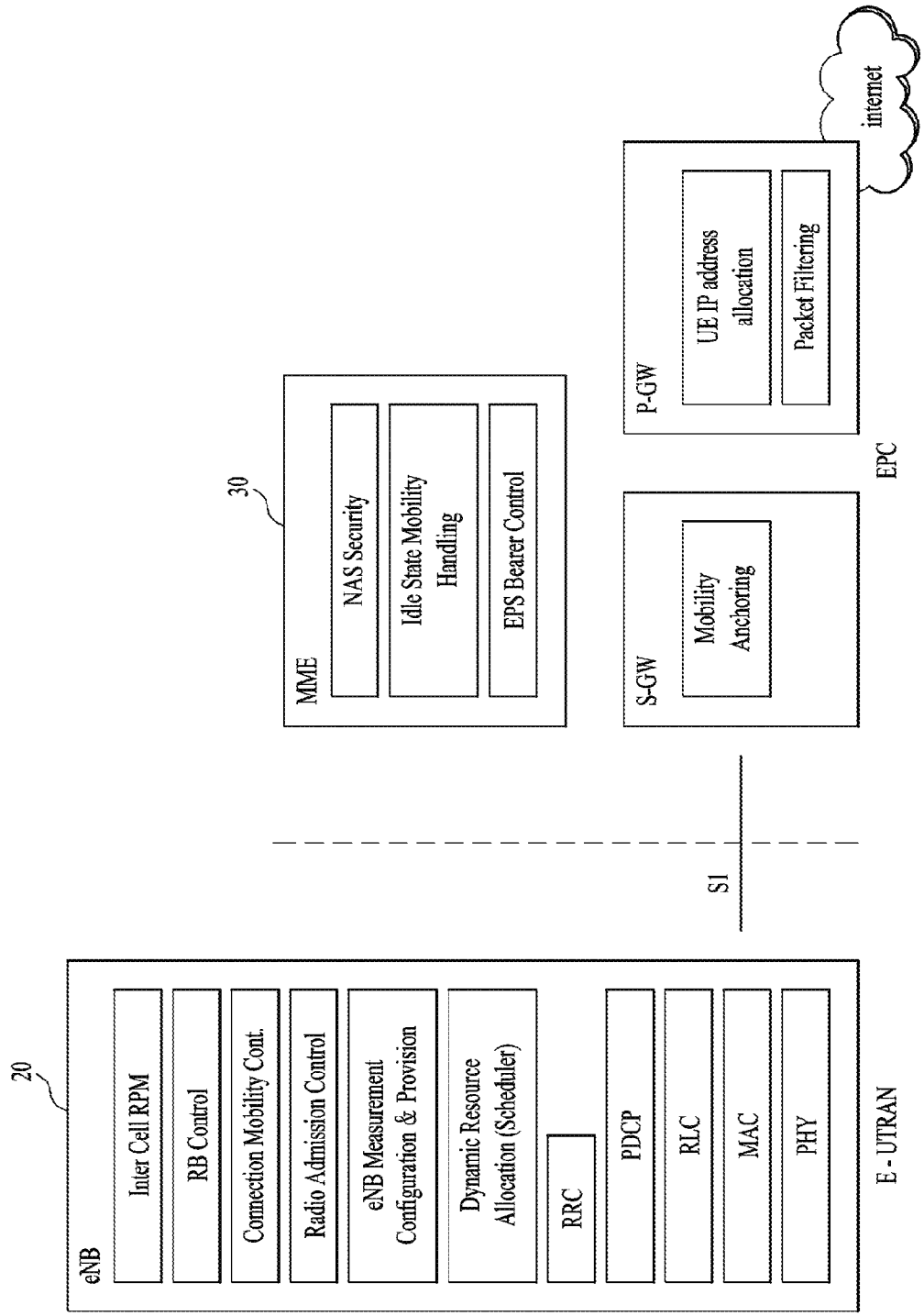

FIG. 3
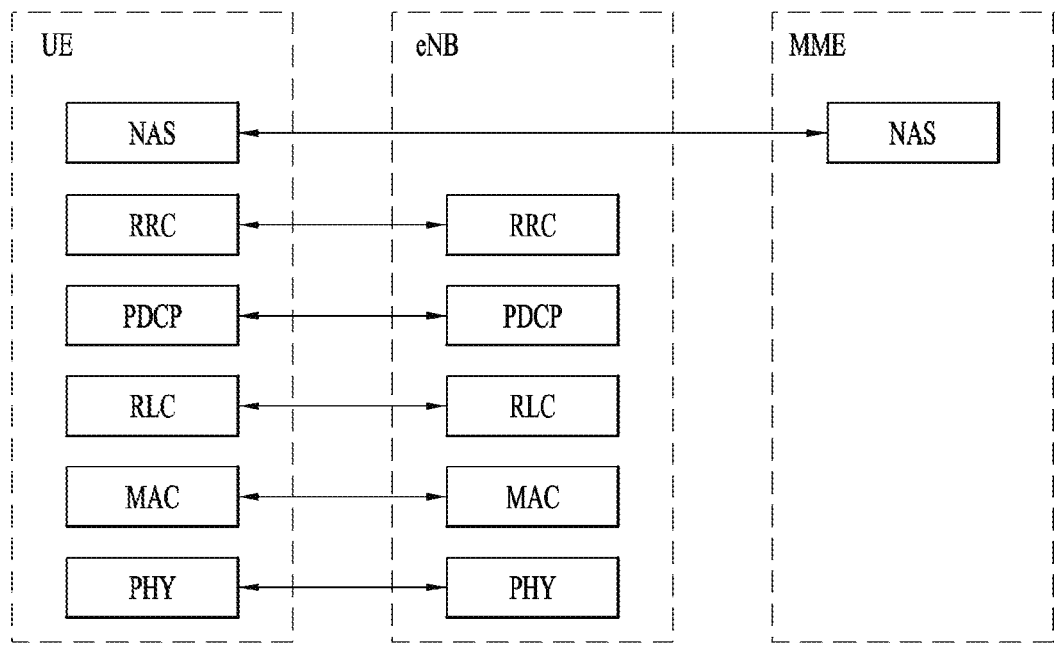
(a) Control-Plane Protocol Stack
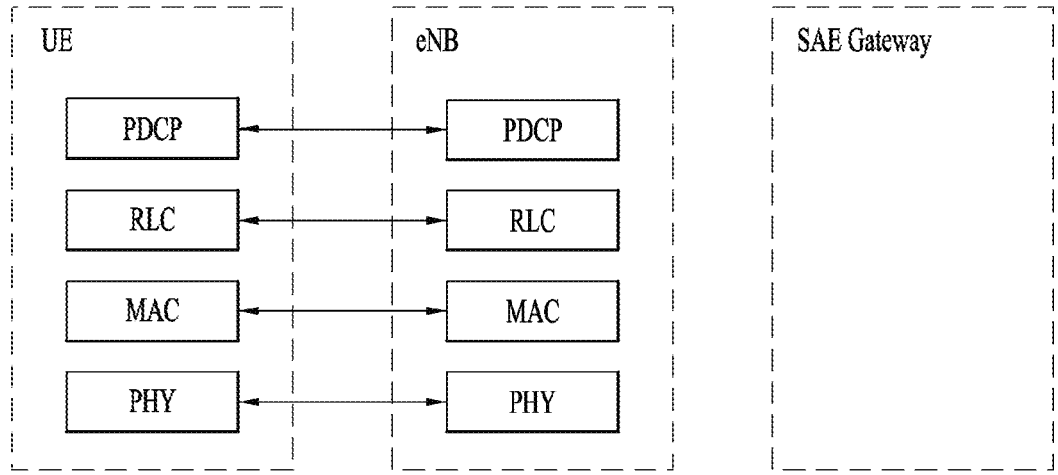
(b) User-Plane Protocol Stack

FIG. 13A

| | | |
|---|---|---|
| Group index$_1$ | LCG ID$_1$ | Buffer Size$_1$ | Oct 1
| Buffer Size$_1$ | Group index$_2$ | | Oct 2
| LCG ID$_2$ | Buffer Size$_2$ | | Oct 3

. . .

| | | |
|---|---|---|
| Group index$_{N-1}$ | LCG ID$_{N-1}$ | Buffer Size$_{N-1}$ | Oct 1.5*N-2
| Buffer Size$_{N-1}$ | Group index$_N$ | | Oct 1.5*N-1
| LCG ID$_N$ | Buffer Size$_N$ | | Oct 1.5*N

FIG. 13B

| | | |
|---|---|---|
| Group index$_1$ | LCG ID$_1$ | Buffer Size$_1$ | Oct 1
| Buffer Size$_1$ | Group index$_2$ | | Oct 2
| LCG ID$_2$ | Buffer Size$_2$ | | Oct 3

. . .

| Group index$_N$ | LCG ID$_N$ | Buffer Size$_N$ | | | | Oct 1.5*N-0.5
| Buffer Size$_N$ | R | R | R | R | | Oct 1.5*N+0.5

| Index Type | Group index$_1$ | Oct 1 |
| --- | --- | --- |
| LCG ID$_1$ | Buffer Size$_1$ | Oct 2 |
| Index Type | Group index$_2$ | Oct 3 |
| LCG ID$_2$ | Buffer Size$_2$ | Oct 4 |
| ... | | |
| Index Type | Group index$_N$ | Oct 2*N-1 |
| LCG ID$_N$ | Buffer Size$_N$ | Oct 2*N |

METHOD FOR TRANSMITTING A SIDELINK BUFFER STATUS REPORTING IN A D2D COMMUNICATION SYSTEM AND DEVICE THEREFOR

Pursuant to 35 U.S.C. § 119(e), this application claims the benefit of U.S. Provisional Patent Application No. 62/250,509, filed on Nov. 4, 2015, the contents of which are hereby incorporated by reference herein in its entirety.

BACKGROUND OF THE INVENTION

Field of the Invention

The present invention relates to a wireless communication system and, more particularly, to a method for transmitting a sidelink buffer status reporting in a D2D (Device to Device) communication system and a device therefor.

Discussion of the Related Art

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. Details of the technical specifications of UMTS and E-UMTS are provided in Release 7 and Release 8 of "3rd Generation Partnership Project; Technical Specification Group Radio Access Network", for example.

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Device to device (D2D) communication refers to the distributed communication technology that directly transfers traffic between adjacent nodes without using infrastructure such as a base station. In a D2D communication environment, each node such as a portable terminal discovers user equipment physically adjacent thereto and transmits traffic after setting communication session. In this way, since D2D communication may solve traffic overload by distributing traffic concentrated into the base station, the D2D communication may have received attention as the element technology of the next generation mobile communication technology after 4G. For this reason, standard institutes such as 3GPP or IEEE have proceeded to establish a D2D communication standard on the basis of LTE-A or Wi-Fi, and Qualcomm has developed their own D2D communication technology.

It is expected that D2D communication contributes to increase throughput of a mobile communication system and create new communication services. Also, D2D communication may support proximity based social network services or network game services. The problem of link of a user equipment located at a shade zone may be solved by using a D2D link as a relay. In this way, it is expected that the D2D technology will provide new services in various fields.

D2D communication technologies such as infrared communication, ZigBee, radio frequency identification (RFID) and near field communications (NFC) based on RFID have been already used. However, since these technologies support communication only of a specific object within a limited distance (about 1 m), it is difficult for the technologies to be strictly regarded as D2D communication technologies.

Although D2D communication has been described as above, details of a method for transmitting data from a plurality of D2D user equipments with the same resource have not been suggested.

SUMMARY OF THE INVENTION

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 13A is an example for Sidelink BSR and Truncated Sidelink BSR MAC control element for even N, and FIG. 13B is an example for Sidelink BSR and Truncated Sidelink BSR MAC control element for odd N;

DETAILED DESCRIPTION OF THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described in the context of a long term evolution (LTE) system and a LTE-advanced (LTE-A) system in the present specification, they are purely exemplary. Therefore, the embodiments of the present invention are applicable to any other communication system corresponding to the above definition. An exemplary system in which the invention disclosed herein may be implemented is a system compliant with the 3GPP specification TS 36.321 Version 12.6.0. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
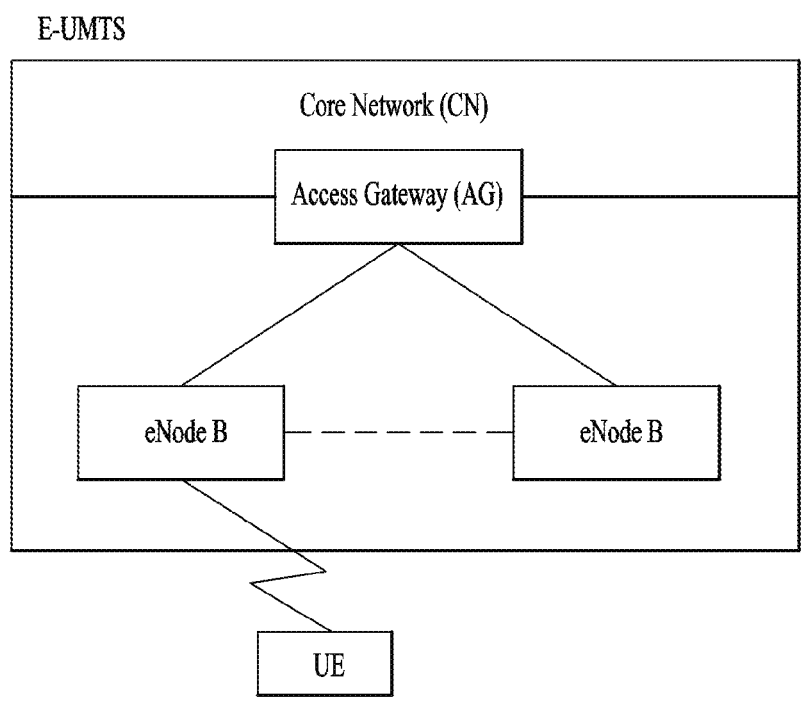
FIG. 1 is a diagram showing a network structure of an Evolved Universal Mobile Telecommunications System (E-UMTS) as an example of a wireless communication system.
Figure 2A:
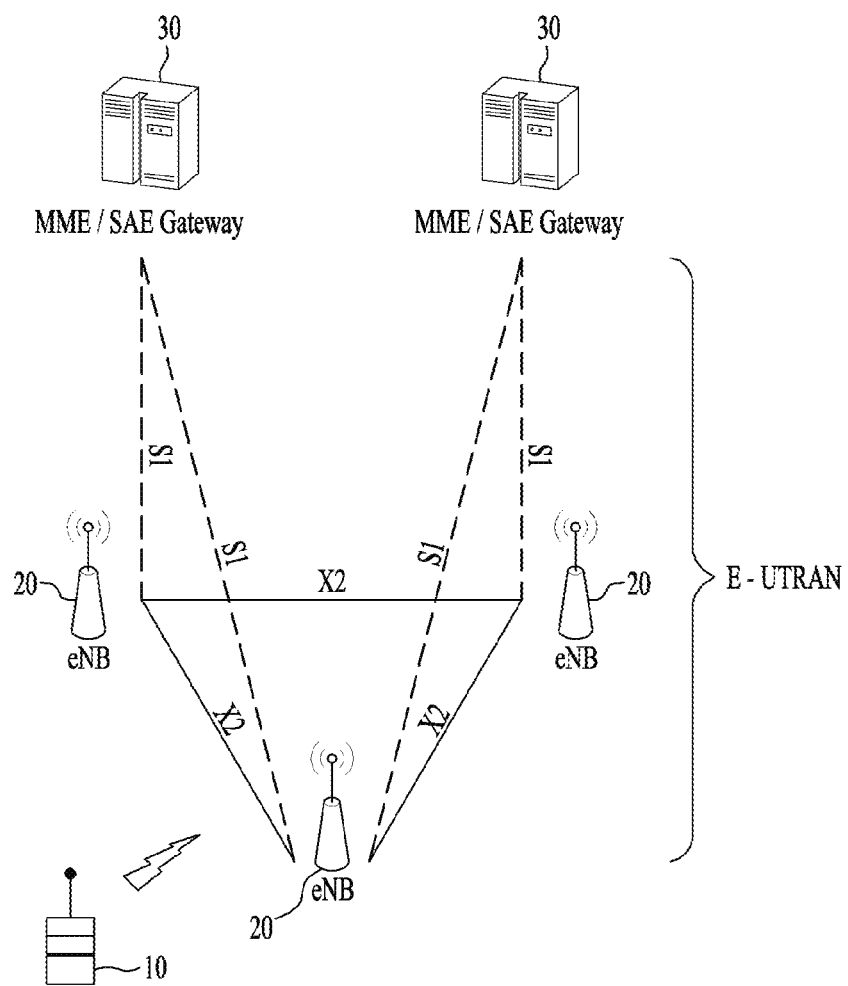
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an Si interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
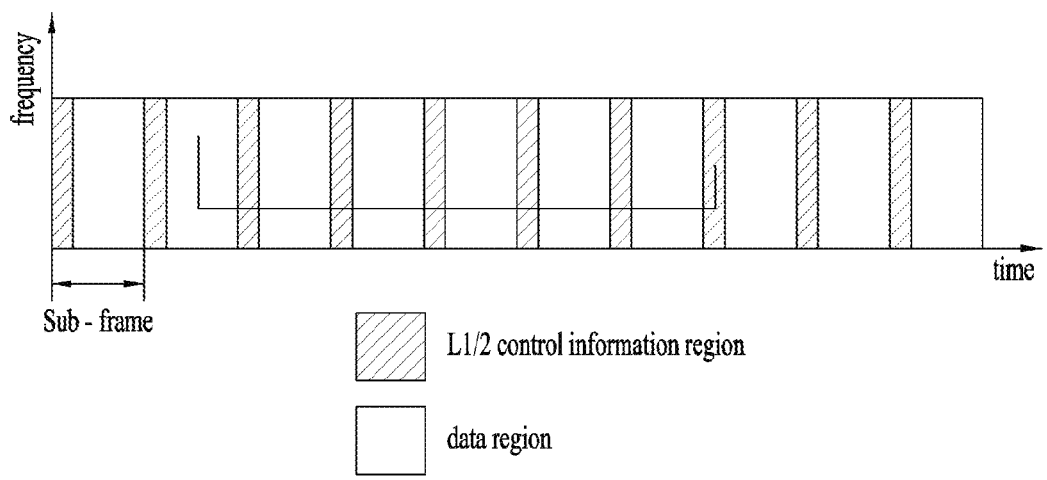
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
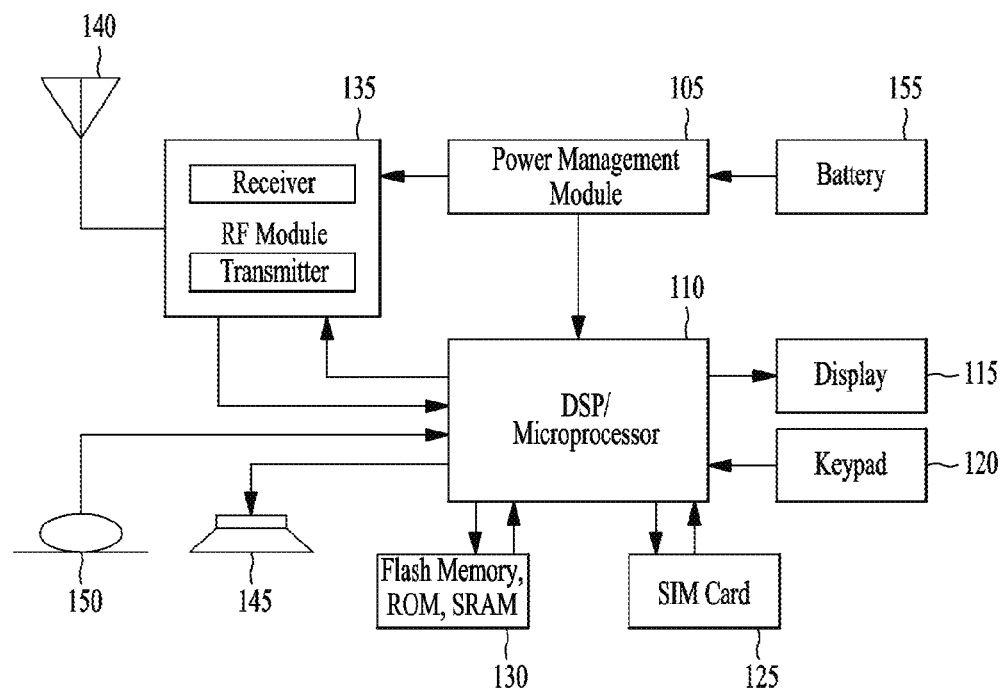
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Recently, Proximity-based Service (ProSe) has been discussed in 3GPP. The ProSe enables different UEs to be connected (directly) each other (after appropriate procedure(s), such as authentication), through eNB only (but not further through Serving Gateway (SGW)/Packet Data Network Gateway (PDN-GW, PGW)), or through SGW/PGW. Thus, using the ProSe, device to device direct communication can be provided, and it is expected that every devices will be connected with ubiquitous connectivity. Direct communication between devices in a near distance can lessen the load of network. Recently, proximity-based social network services have come to public attention, and new kinds of proximity-based applications can be emerged and may create new business market and revenue. For the first step, public safety and critical communication are required in the market. Group communication is also one of key components in the public safety system. Required functionalities are: Discovery based on proximity, Direct path communication, and Management of group communications.

Use cases and scenarios are for example: i) Commercial/social use, ii) Network offloading, iii) Public Safety, iv) Integration of current infrastructure services, to assure the consistency of the user experience including reachability and mobility aspects, and v) Public Safety, in case of absence of EUTRAN coverage (subject to regional regulation and operator policy, and limited to specific public-safety designated frequency bands and terminals).

Figure 6:
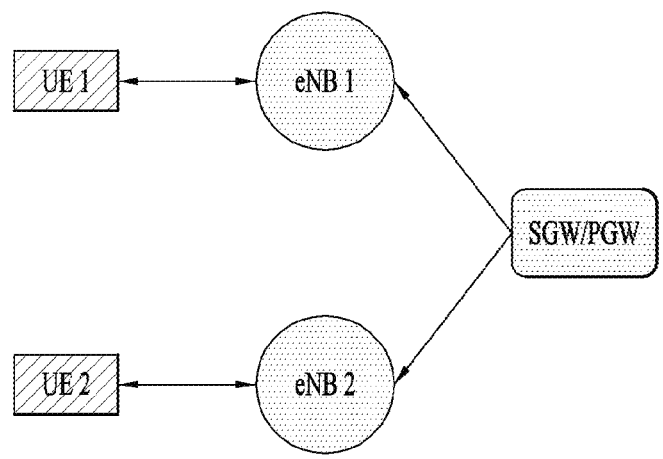
FIG. 6 is an example of default data path for a normal communication.

FIG. 6 is an example of default data path for communication between two UEs. With reference to FIG. 6, even when two UEs (e.g., UE1, UE2) in close proximity communicate with each other, their data path (user plane) goes via the operator network. Thus a typical data path for the communication involves eNB(s) and/or Gateway(s) (GW(s)) (e.g., SGW/PGW).

Figure 7:
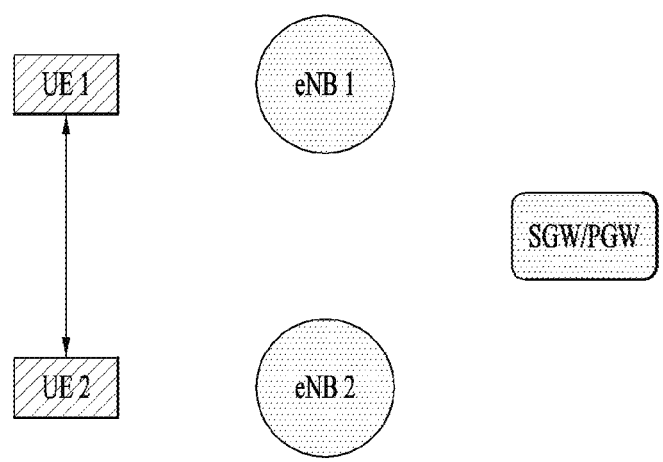
FIGS. 7 and 8 are examples of data path scenarios for a proximity communication.
Figure 8:
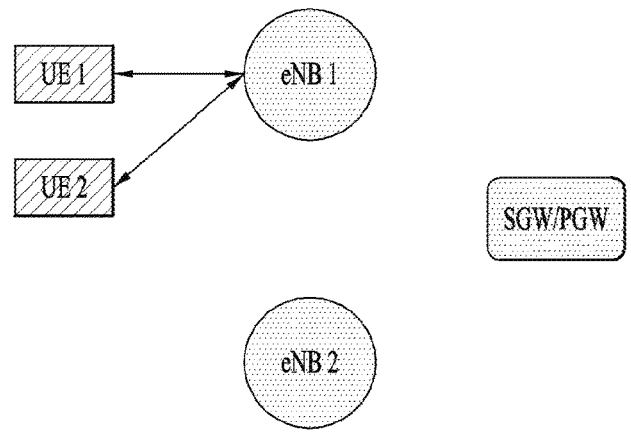

FIGS. 7 and 8 are examples of data path scenarios for a proximity communication. If wireless devices (e.g., UE1, UE2) are in proximity of each other, they may be able to use a direct mode data path (FIG. 7) or a locally routed data path (FIG. 8). In the direct mode data path, wireless devices are connected directly each other (after appropriate procedure(s), such as authentication), without eNB and SGW/PGW. In the locally routed data path, wireless devices are connected each other through eNB only.

Figure 9:
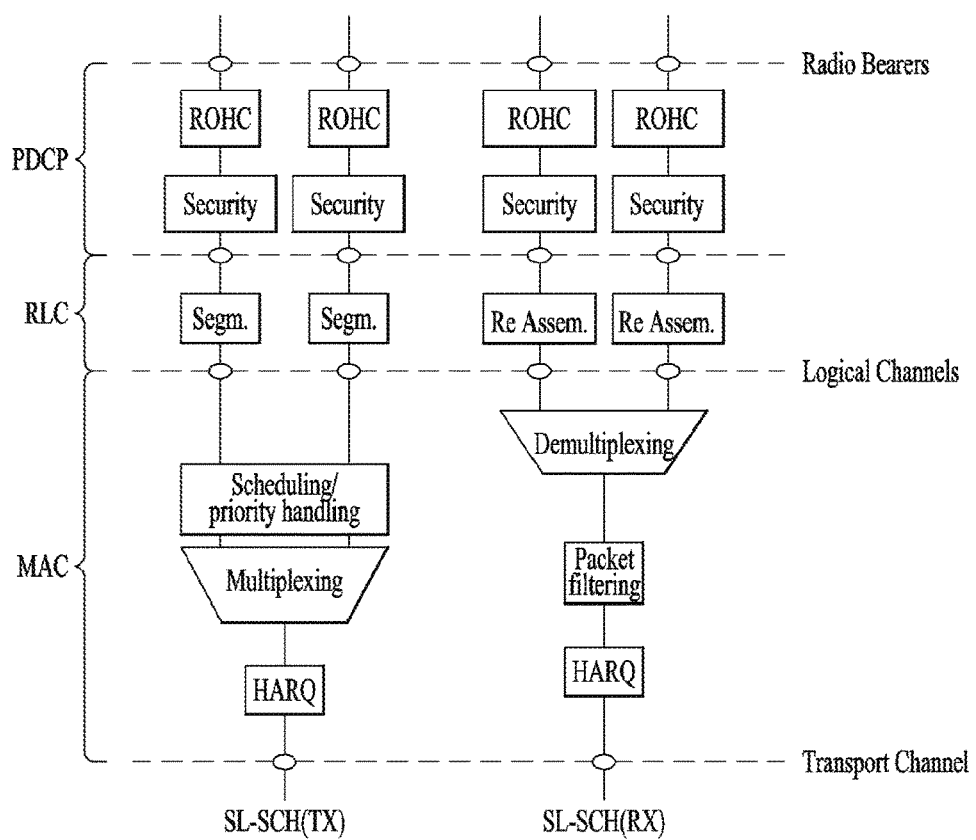
FIG. 9 is a conceptual diagram illustrating for a Layer 2 Structure for Sidelink.

FIG. 9 is a conceptual diagram illustrating for a Layer 2 structure for Sidelink.

Sidelink communication is a mode of communication whereby UEs can communicate with each other directly over the PC5 interface This communication mode is supported when the UE is served by E-UTRAN and when the UE is outside of E-UTRA coverage. Only those UEs authorized to be used for public safety operation can perform sidelink communication.

In order to perform synchronization for out of coverage operation UE(s) may act as a synchronization source by transmitting SBCCH and a synchronization signal. SBCCH carries the most essential system information needed to receive other sidelink channels and signals. SBCCH along with a synchronization signal is transmitted with a fixed periodicity of 40 ms. When the UE is in network coverage, the contents of SBCCH are derived from the parameters signalled by the eNB. When the UE is out of coverage, if the UE selects another UE as a synchronization reference, then the content of SBCCH is derived from the received SBCCH; otherwise UE uses pre-configured parameters. SIB18 provides the resource information for synchronization signal and SBCCH transmission. There are two pre-configured subframes every 40 ms for out of coverage operation. UE receives synchronization signal and SBCCH in one subframe and transmit synchronization signal and SBCCH on another subframe if UE becomes synchronization source based on defined criterion.

UE performs sidelink communication on subframes defined over the duration of Sidelink Control period. The sidelink Control period is the period over which resources allocated in a cell for sidelink control information and sidelink data transmissions occur. Within the sidelink Control period the UE sends sidelink control information followed by sidelink data. sidelink control information indicates a Layer 1 ID and characteristics of the transmissions (e.g. MCS, location of the resource(s) over the duration of Sidelink Control period, timing alignment).

The UE performs transmission and reception over Uu and PC5 with the following decreasing priority order:
  Uu transmission/reception (highest priority);
  PC5 sidelink communication transmission/reception;
  PC5 sidelink discovery announcement/monitoring (lowest priority).

Figure 10A:
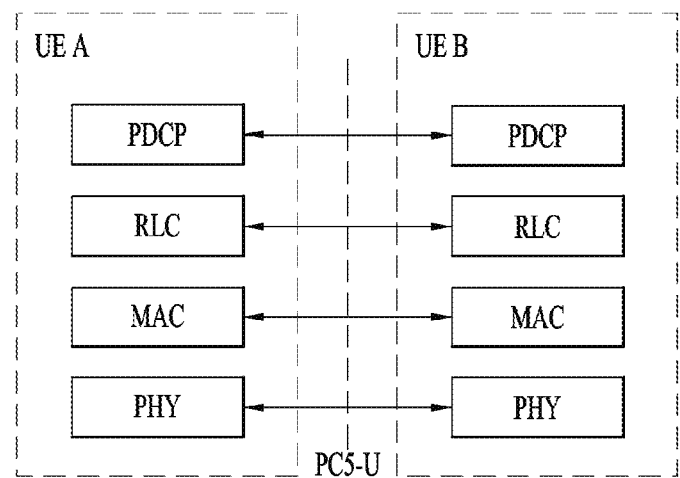
FIG. 10A is a conceptual diagram illustrating for User-Plane protocol stack for ProSe Direct Communication.
Figure 10B:
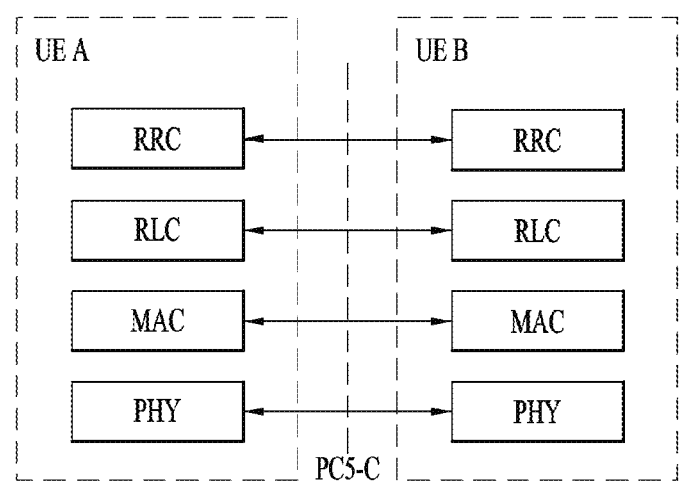
FIG. 10B is Control-Plane protocol stack for ProSe Direct Communication.

FIG. 10A is a conceptual diagram illustrating for User-Plane protocol stack for ProSe Direct Communication, and FIG. 10B is Control-Plane protocol stack for ProSe Direct Communication.

FIG. 10A shows the protocol stack for the user plane, where PDCP, RLC and MAC sublayers (terminate at the other UE) perform the functions listed for the user plane (e.g. header compression, HARQ retransmissions). The PC5 interface consists of PDCP, RLC, MAC and PHY as shown in FIG. 10A.

User plane details of ProSe Direct Communication: i) there is no HARQ feedback for sidelink communication, ii) RLC UM is used for sidelink communication, iii) RLC UM is used for sidelink communication, iv) a receiving RLC UM entity used for sidelink communication does not need to be configured prior to reception of the first RLC UMD PDU, and v) ROHC Unidirectional Mode is used for header compression in PDCP for sidelink communication.

A UE may establish multiple logical channels. LCID included within the MAC subheader uniquely identifies a logical channel within the scope of one Source Layer-2 ID and ProSe Layer-2 Group ID combination. Parameters for logical channel prioritization are not configured. The Access stratum (AS) is provided with the PPPP of protocol data unit transmitted over PC5 interface by higher layer. There is a PPPP associated with each logical channel.

SL-RNTI is an unique identification used for ProSe Direct Communication Scheduling.

The Source Layer-2 ID identifies the sender of the data in sidelink communication. The Source Layer-2 ID is 24 bits long and is used together with Destination Layer-2 ID and LCID for identification of the RLC UM entity and PDCP entity in the receiver.

The destination Layer-2 ID identifies the target of the data in sidelink communication. The Destination Layer-2 ID is 24 bits long and is split in the MAC layer into two bit strings: i) One bit string is the LSB part (8 bits) of Destination Layer-2 ID and forwarded to physical layer as Group Destination ID. This identifies the target of the intended data in sidelink control information and is used for filtering of packets at the physical layer. And ii) Second bit string is the MSB part (16 bits) of the Destination Layer-2 ID and is carried within the MAC header. This is used for filtering of packets at the MAC layer.

No Access Stratum signalling is required for group formation and to configure Source Layer-2 ID, Destination Layer-2 ID and Group Destination ID in the UE. These identities are either provided by higher layer or derived from identities provided by higher layer. In case of groupcast and broadcast, the ProSe UE ID provided by higher layer is used directly as the Source Layer-2 ID and the ProSe Layer-2 Group ID provided by higher layer is used directly as the Destination Layer-2 ID in the MAC layer. In case of one-to-one communications, higher layer provides Source Layer-2 ID and Destination Layer-2 ID.

FIG. 10B shows the protocol stack for the control plane.

A UE does not establish and maintain a logical connection to receiving UEs prior to one-to-many a sidelink communication. Higher layer establish and maintain a logical connection for one-to-one sidelink communication including ProSe UE-to-Network Relay operation.

The Access Stratum protocol stack for SBCCH in the PC5 interface consists of RRC, RLC, MAC and PHY as shown below in FIG. 10B.

The PPPP is a ProSe Per-Packet Priority. The ProSe Per-Packet Priority is summarized as follows:

i) a single UE shall be able to transmit packets of different priorities on PC5, ii) the UE upper layers provide to the access stratum a ProSe Per Packet Priority from a range of possible values, iii) the ProSe Per Packet Priority is used to support preferential transmission of packets both intra-UE and across different UEs, iv) the support of 8 priority levels for the ProSe Per Packet Priority should be sufficient, v) the ProSe Per Packet Priority applies to all PC5 traffic, and vi) the ProSe Per Packet Priority is independent of the layer-2 destination of the transmission.

From the above summary, it seems that SA2 think ProSe packet prioritization based on PPP is very important and should be supported in PC5 interface in any case. Keeping this observation in mind, we explain how the LCP procedures should be changed from Rel-12.

Figure 11:
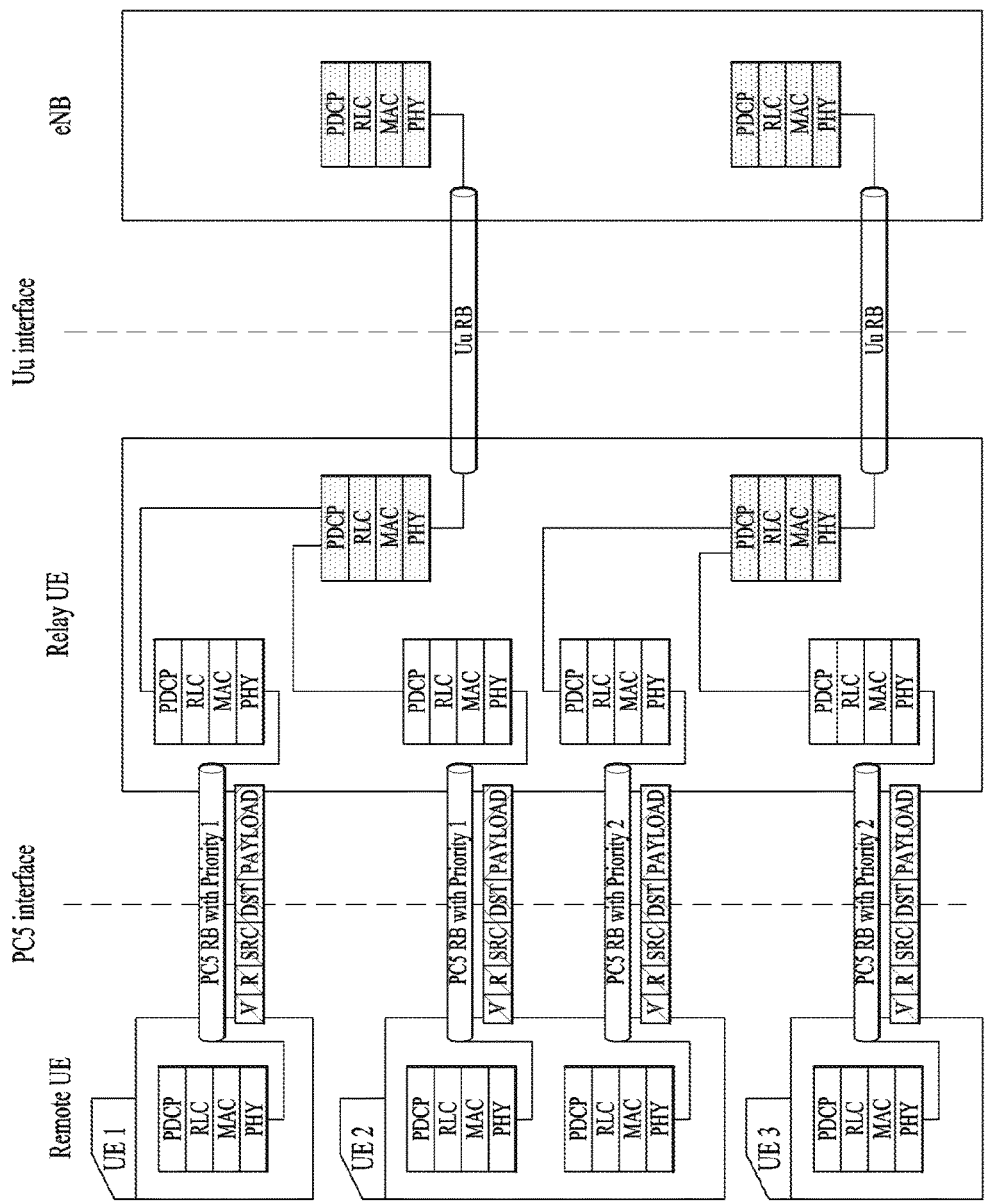
FIG. 11 is an example for PC5 interface between remote UEs and a relay UE.

FIG. 11 is an example for PC5 interface between remote UEs and a relay UE.

In ProSe, a UE communicates with other UEs directly over PC5 interface.

By introducing a Relay UE for UE-to-NW relay, a remote UE transmits data to an eNB via the Relay UE, and the eNB transmits data to the remote UE via the Relay UE. I.e., the Relay UE relays data to/from eNB.

As data transfer between the remote UE and the Relay UE is ProSe communication, the Relay UE is communicating with the remote UE over PC5 interface. In the meantime, as data transfer between the Relay UE and the eNB is a normal uplink/downlink (Uu) communication, the Relay UE is communicating with the eNB over Uu interface. This implies that if data has higher priority in PC5 communication, it should also be higher prioritized in Uu communication.

Over PC5 interface, Per-Packet Priority (PPP), is used to prioritize a certain packet, where the priority is independent with ProSe destination or ProSe UE. In order to prioritize the packet with higher priority over Uu interface as well, the Relay UE needs to know the priority of the packet so that the Relay UE provides more opportunities of transmission to the packet with higher priority.

In order to transmit on the SL-SCH, the MAC entity must have a sidelink grant. The sidelink grant is selected as follows: if the MAC entity is configured to receive a sidelink grant dynamically on the PDCCH and more data is available in STCH than can be transmitted in the current SC period, the MAC entity shall determine a set of subframes in which transmission of SCI and transmission of first transport block occur using the received sidelink grant, consider the received sidelink grant to be a configured sidelink grant occurring in those subframes starting at the beginning of the first available SC Period which starts at least 4 subframes after the subframe in which the sidelink grant was received, overwriting a previously configured sidelink grant occurring in the same SC period, if available, and clear the configured sidelink grant at the end of the corresponding SC Period.

If the MAC entity has a configured sidelink grant occurring in this subframe, and if the configured sidelink grant corresponds to transmission of SCI, the MAC entity shall, for each subframe, instruct the physical layer to transmit SCI corresponding to the configured sidelink grant.

If the MAC entity has a configured sidelink grant occurring in this subframe, and if the configured sidelink grant corresponds to transmission of first transport block, the MAC entity shall deliver the configured sidelink grant and the associated HARQ information to the Sidelink HARQ Entity for this subframe.

For PDU(s) associated with one SCI, MAC shall consider only logical channels with same Source Layer-2 ID-Destination Layer-2 ID pairs.

Figure 12:
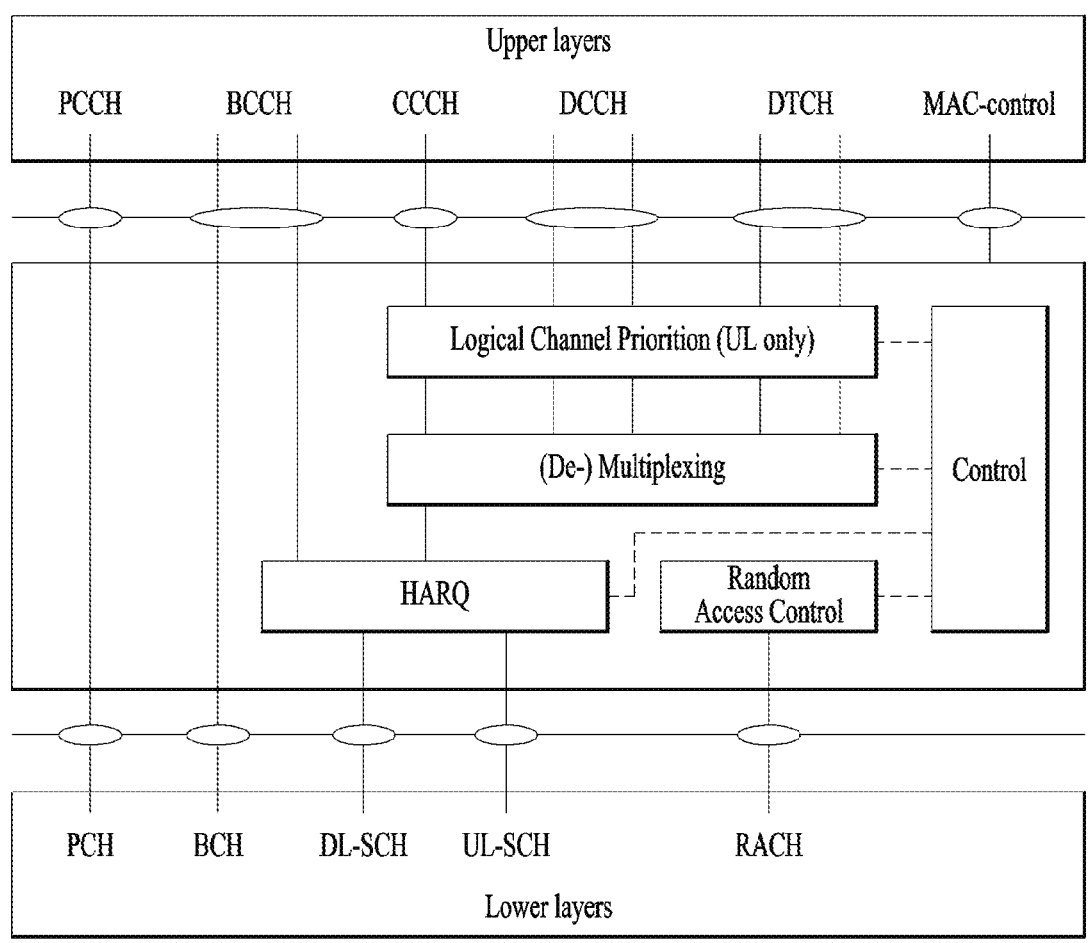
FIG. 12 is a diagram for MAC structure overview in a UE side.

FIG. 12 is a diagram for MAC structure overview in a UE side.

The MAC layer handles logical-channel multiplexing, hybrid-ARQ retransmissions, and uplink and downlink scheduling. It is also responsible for multiplexing/demultiplexing data across multiple component carriers when carrier aggregation is used.

The MAC provides services to the RLC in the form of logical channels. A logical channel is defined by the type of information it carries and is generally classified as a control channel, used for transmission of control and configuration information necessary for operating an LTE system, or as a traffic channel, used for the user data. The set of logical-channel types specified for LTE includes:

The Broadcast Control Channel (BCCH), used for transmission of system information from the network to all terminals in a cell. Prior to accessing the system, a terminal needs to acquire the system information to find out how the system is configured and, in general, how to behave properly within a cell.

The Paging Control Channel (PCCH), used for paging of terminals whose location on a cell level is not known to the network. The paging message therefore needs to be transmitted in multiple cells.

The Common Control Channel (CCCH), used for transmission of control information in conjunction with random access.

The Dedicated Control Channel (DCCH), used for transmission of control information to/from a terminal. This channel is used for individual configuration of terminals such as different handover messages.

The Multicast Control Channel (MCCH), used for transmission of control information required for reception of the MTCH.

The Dedicated Traffic Channel (DTCH), used for transmission of user data to/from a terminal. This is the logical channel type used for transmission of all uplink and non-MBSFN downlink user data.

The Multicast Traffic Channel (MTCH), used for downlink transmission of MBMS services.

To support priority handling, multiple logical channels, where each logical channel has its own RLC entity, can be multiplexed into one transport channel by the MAC layer. At the receiver, the MAC layer handles the corresponding demultiplexing and forwards the RLC PDUs to their respective RLC entity for in-sequence delivery and the other functions handled by the RLC. To support the demultiplexing at the receiver, a MAC is used. To each RLC PDU, there is an associated sub-header in the MAC header. The sub-header contains the identity of the logical channel (LCID) from which the RLC PDU originated and the length of the PDU in bytes. There is also a flag indicating whether this is the last sub-header or not. One or several RLC PDUs, together with the MAC header and, if necessary, padding to meet the scheduled transport-block size, form one transport block which is forwarded to the physical layer.

In addition to multiplexing of different logical channels, the MAC layer can also insert the so-called MAC control elements into the transport blocks to be transmitted over the transport channels. A MAC control element is used for inband control signaling—for example, timing-advance commands and random-access response. Control elements are identified with reserved values in the LCID field, where the LCID value indicates the type of control information. Furthermore, the length field in the sub-header is removed for control elements with a fixed length.

The MAC multiplexing functionality is also responsible for handling of multiple component carriers in the case of carrier aggregation. The basic principle for carrier aggregation is independent processing of the component carriers in the physical layer, including control signaling, scheduling and hybrid-ARQ retransmissions, while carrier aggregation is invisible to RLC and PDCP. Carrier aggregation is therefore mainly seen in the MAC layer, where logical channels, including any MAC control elements, are multiplexed to form one (two in the case of spatial multiplexing) transport block(s) per component carrier with each component carrier having its own hybrid-ARQ entity.

Meanwhile, UEs that already have a valid grant obviously do not need to request uplink resources. However, to allow the scheduler to determine the amount of resources to grant to each terminal in future subframes, information about the buffer situation and the power availability is useful, as discussed above. This information is provided to the scheduler as part of the uplink transmission through MAC control element. The LCID field in one of the MAC subheaders is set to a reserved value indicating the presence of a buffer status report.

From a scheduling perspective, buffer information for each logical channel is beneficial, although this could result in a significant overhead. Logical channels are therefore grouped into logical-channel groups and the reporting is done per group. The buffer-size field in a buffer-status report indicates the amount of data available transmission across all logical channels in a logical-channel group.

FIG. 13A and FIG. 13B are examples for format of SL BSR MAC CE.

The Buffer Status Reporting (BSR) procedure is used to provide a serving eNB with information about the amount of data available for transmission (DAT) in the UL buffers of the UE. RRC may control BSR reporting by configuring the three timers periodicBSR-Timer and retxBSR-Timer and logicalChannelSR-ProhibitTimer and by, for each logical channel, optionally signaling Logical Channel Group (LCG) which allocates the logical channel to an LCG The sidelink Buffer Status reporting procedure is used to provide the serving eNB with information about the amount of sidelink data available for transmission in the SL buffers associated with the MAC entity. RRC controls BSR reporting for the sidelink by configuring the two timers periodicBSR-TimerSL and retx-BSR-TimerSL. Each sidelink logical channel belongs to a ProSe Destination. Each sidelink logical channel is allocated to an LCG depending on the priority of the sidelink logical channel and the mapping between LCG ID and priority which is provided by upper layers in logicalChGroupInfoList. LCG is defined per ProSe Destination.

A sidelink Buffer Status Report (BSR) shall be triggered if any of the following events occur: if the MAC entity has a configured SL-RNTI i) SL data, for a sidelink logical channel of a ProSe Destination, becomes available for transmission in the RLC entity or in the PDCP entity and either the data belongs to a sidelink logical channel with higher priority than the priorities of the sidelink logical channels which belong to any LCG belonging to the same ProSe Destination and for which data is already available for transmission, or there is currently no data available for transmission for any of the sidelink logical channels belonging to the same ProSe Destination, in which case the Sidelink BSR is referred below to as "Regular Sidelink BSR", ii) UL resources are allocated and number of padding bits remaining after a Padding BSR has been triggered is equal to or larger than the size of the Sidelink BSR MAC control element containing the buffer status for at least one LCG of a ProSe Destination plus its subheader, in which case the Sidelink BSR is referred below to as "Padding Sidelink BSR", iii) retx-BSR-TimerSL expires and the MAC entity has data available for transmission for any of the sidelink logical channels, in which case the Sidelink BSR is referred below to as "Regular Sidelink BSR", iv) periodicBSR-TimerSL expires, in which case the Sidelink BSR is referred below to as "Periodic Sidelink BSR". Else, An SL-RNTI is configured by upper layers and SL data is available for transmission in the RLC entity or in the PDCP entity, in which case the Sidelink BSR is referred below to as "Regular Sidelink BSR".

For Regular and Periodic Sidelink BSR, if the number of bits in the UL grant is equal to or larger than the size of a Sidelink BSR containing buffer status for all LCGs having data available for transmission plus its subheader, the MAC entity reports Sidelink BSR containing buffer status for all LCGs having data available for transmission. Else, the MAC entity reports Truncated Sidelink BSR containing buffer status for as many LCGs having data available for transmission as possible, taking the number of bits in the UL grant into consideration.

If the Buffer Status reporting procedure determines that at least one Sidelink BSR has been triggered and not cancelled: if the MAC entity has UL resources allocated for new transmission for this TTI and the allocated UL resources can accommodate a Sidelink BSR MAC control element plus its subheader as a result of logical channel prioritization, the MAC entity instructs the Multiplexing and Assembly procedure to generate the Sidelink BSR MAC control element(s), starts or restarts periodic-BSR-TimerSL except when all the generated Sidelink BSRs are Truncated Sidelink BSRs, and starts or restarts retx-BSR-TimerSL.

Else if a Regular Sidelink BSR has been triggered, if an uplink grant is not configured, a Scheduling Request shall be triggered.

A MAC PDU shall contain at most one Sidelink BSR MAC control element, even when multiple events trigger a Sidelink BSR by the time a Sidelink BSR can be transmitted in which case the Regular Sidelink BSR and the Periodic Sidelink BSR shall have precedence over the padding Sidelink BSR.

The MAC entity shall restart retx-BSR-TimerSL upon reception of an SL grant.

All triggered regular Sidelink BSRs shall be cancelled in case the remaining configured SL grant(s) valid for this SC Period can accommodate all pending data available for transmission. All triggered Sidelink BSRs shall be cancelled in case the MAC entity has no data available for transmission for any of the sidelink logical channels. All triggered Sidelink BSRs shall be cancelled when a Sidelink BSR (except for Truncated Sidelink BSR) is included in a MAC PDU for transmission. All triggered Sidelink BSRs shall be cancelled, and retx-BSR-TimerSL and periodic-BSR-TimerSL shall be stopped, when upper layers configure autonomous resource selection.

The MAC entity shall transmit at most one Regular/Periodic Sidelink BSR in a TTI. If the MAC entity is requested to transmit multiple MAC PDUs in a TTI, it may include a padding Sidelink BSR in any of the MAC PDUs which do not contain a Regular/Periodic Sidelink BSR.

All Sidelink BSRs transmitted in a TTI always reflect the buffer status after all MAC PDUs have been built for this TTI. Each LCG shall report at the most one buffer status value per TTI and this value shall be reported in all Sidelink BSRs reporting buffer status for this LCG.

FIG. 13A is an example for Sidelink BSR and Truncated Sidelink BSR MAC control element for even N, and FIG. 13B is an example for Sidelink BSR and Truncated Sidelink BSR MAC control element for odd N.

Sidelink BSR and Truncated Sidelink BSR MAC control elements consist of one group index field, one LCG ID field and one corresponding Buffer Size field per reported target group.

The Sidelink BSR MAC control elements are identified by MAC PDU subheaders with LCIDs as specified in Table 1. They have variable sizes.

TABLE 1

| Values of LCID for UL-SCH | |
|---|---|
| Index | LCID values |
| 00000 | CCCH |
| 00001-01010 | Identity of the logical channel |

TABLE 1-continued

| Values of LCID for UL-SCH | |
|---|---|
| Index | LCID values |
| 01011 | CCCH |
| 01100-10101 | Reserved |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

For each included group, the fields of the FIG. 13A and FIG. 13B are defined as follows:

A field of "Group index" identifies the ProSe Destination. The length of this field is 4 bits. The value is set to the index of the destination reported in destinationInfoList.

A field of "LCG ID" identifies the group of logical channel(s) which buffer status is being reported. The length of the field is 2 bits and it is set to "11".

A field of "Buffer Size" identifies the total amount of data available across all logical channels of a ProSe Destination after all MAC PDUs for the TTI have been built. The amount of data is indicated in number of bytes. It shall include all data that is available for transmission in the RLC layer and in the PDCP layer. The size of the RLC and MAC headers are not considered in the buffer size computation. The length of this field is 6 bits. The values taken by the Buffer Size field are shown in Table 2.

TABLE 2

| Buffer size levels for BSR | |
|---|---|
| Index | Buffer Size (BS) value [bytes] |
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |

TABLE 2-continued

Buffer size levels for BSR

| Index | Buffer·Size·(BS)·value·[bytes] |
|---|---|
| 33 | 1326·<·BS·<=·1552 |
| 34 | 1552·<·BS·<=·1817 |
| 35 | 1817·<·BS·<=·2127 |
| 36 | 2127·<·BS·<=·2490 |
| 37 | 2490·<·BS·<=·2915 |
| 38 | 2915·<·BS·<=·3413 |
| 39 | 3413·<·BS·<=·3995 |
| 40 | 3995·<·BS·<=·4677 |
| 41 | 4677·<·BS·<=·5476 |
| 42 | 5476·<·BS·<=·6411 |
| 43 | 6411·<·BS·<=·7505 |
| 44 | 7505·<·BS·<=·8787 |
| 45 | 8787·<·BS·<=·10287 |
| 46 | 10287·<·BS·<=·12043 |
| 47 | 12043·<·BS·<=·14099 |
| 48 | 14099·<·BS·<=·16507 |
| 49 | 16507·<·BS·<=·19325 |
| 50 | 19325·<·BS·<=·22624 |
| 51 | 22624·<·BS·<=·26487 |
| 52 | 26487·<·BS·<=·31009 |
| 53 | 31009·<·BS·<=·36304 |
| 54 | 36304·<·BS·<=·42502 |
| 55 | 42502·<·BS·<=·49759 |
| 56 | 49759·<·BS·<=·58255 |
| 57 | 58255·<·BS·<=·68201 |
| 58 | 68201·<·BS·<=·79846 |
| 59 | 79846·<·BS·<=·93479 |
| 60 | 93479·<·BS·<=·109439 |
| 61 | 109439·<·BS·<=·128125 |
| 62 | 128125·<·BS·<=·150000 |
| 63 | BS·>·150000 |

A field of "R" is a Reserved bit by setting to "0".

For one to one communication, unicast addresses (i.e. Source UE ID and Destination UE ID) are set in SRC and DST fields respectively in MAC header. RAN2 makes an initial assumption that the ID remains 24 bits (16 MSBs of destination UE ID is set in the DST field in MAC header and 8 LSBs of destination UE ID are included in scheduling control information). A new MAC PDU format version number indicates that unicast addresses are set in SRC and DST fields.

The legacy SL BSR has Group Index field which identifies the ProSe Destination. The length of this field is 4 bits, and the value is set to the index of the destination reported in destinationInfoList in SidelinkUEInformation message.

Then, a question comes, how the Group Index in SL BSR is mapped to unicast ID. This document addresses this issue.

Figure 14:
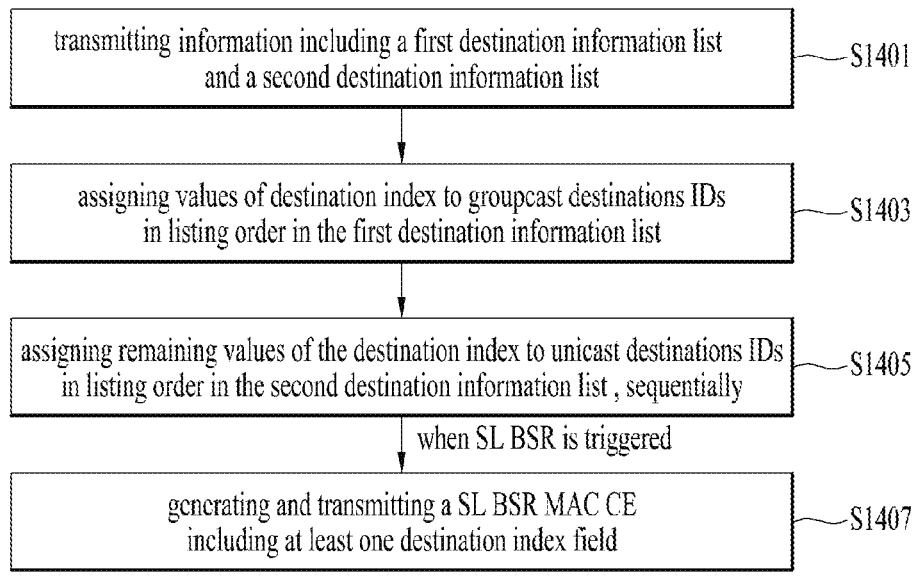
FIG. 14 is a diagram for generating and transmitting a sidelink buffer status reporting in a D2D communication system according to embodiments of the present invention.

FIG. 14 is a diagram for generating and transmitting a sidelink buffer status reporting in a D2D communication system according to embodiments of the present invention, First, it is expected that a new IE, e.g. unicast-destinationInfoList, would be included in the SidelinkUEInformation message to inform the eNB of the unicast ID to which the UE would send SL data.

The UE transmits information related to a first destination information list including at least one groupcast destination identifier (ID) and a second destination information list including at least one unicast destination ID via RRC message (S1401).

Preferably, the information related to a first destination information list and the second destination information is "destinationInfolist" in SidelinkUEInformation.

The information of "destinationInfoList" indicates the destination(s) for relay or non-relay related one-to-one or one-to-many sidelink communication. For one-to-one sidelink communication the destination is identified by the ProSe UE ID for unicast communication, while for one-to-many the destination it is identified by the ProSe Layer-2 Group ID as specified in TS 23.303.

The UE assigns values of destination index to groupcast destinations IDs in listing order in the first destination information list (S1403). And then remaining values of the destination index after setting to the groupcast destinations IDs to unicast destinations IDs in listing order in the second destination information list, sequentially (S1405).

Preferably, the UE is a non-relay UE. The relay UE relays SL data from the eNB to the Remote UE. The non-relay UE transmits SL data to a peer UE via sidelink, directly.

The UE generates and transmits a SL BSR MAC CE including at least one destination index field identifying at least one destination, when SL BSR is triggered (S1407).

Preferably, one of the at least one destination index field have one to one correspondence to one of the assigned values of destination index.

Preferably, a total number of the groupcast destination IDs and the unicast destinations IDs is less than or equal to 16.

In the legacy, the Group Index values are mapped to groupcast IDs in listing order in destinationInfoList. If the total number of groupcast ID and unicast ID is less than or equal to 16, there are remaining values in Group Index after mapping to groupcast IDs, and those remaining values can be mapped to unicast IDs in listing order in unicast-destinationInfoList.

For example, if destinationInfoList contains {groupcast ID1, groupcast ID2} and unicast-destinationInfoList contains {unicast ID1, unicast ID2, unicast ID3}, then the mapping between Group Index and groupcast/unicast IDs are as follows: i) Group Index 0=groupcast ID1, ii) Group Index 1=groupcast ID2, iii) Group Index 2=unicast ID1, iv) Group Index 3=unicast ID2, v) Group Index 4=unicast ID3.

Preferably, a size of the destination index field is 4-bits.

Preferably, the at least one unicast destination ID is identified by a Layer-2 ID for unicast communication, and the at least one groupcast destination ID is identified by the ProSe Layer-2 Group ID.

Meanwhile, if the total number of the groupcast destination IDs and the unicast destinations IDs is more than 16, a new SL BSR should be introduced because there is no room for extension in legacy SL BSR format. As a new SL BSR is introduced, a new LCID value or R bit in R/R/E/LCID MAC subheader should be used to indicate the new SL BSR.

In this case, the mapping rule between Group Index and groupcast/unicast IDs are same as above mentioned.

Figure 15:
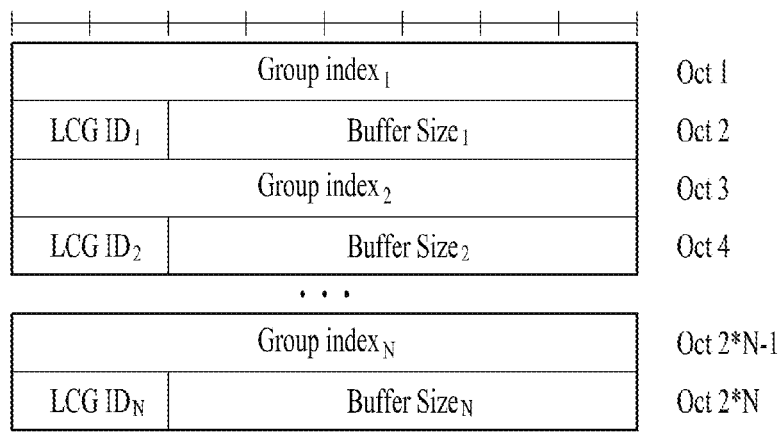
FIG. 15 is an example for a new SL BSR MAC CE format in a D2D communication system according to embodiments of the present invention.

The Group Index values are first mapped to groupcast IDs in listing order in destinationInfoList, and then mapped to unicast IDs in listing order in unicast-destinationInfoList. An example of new SL BSR format is shown in FIG. 15.

Figures 16, 17:
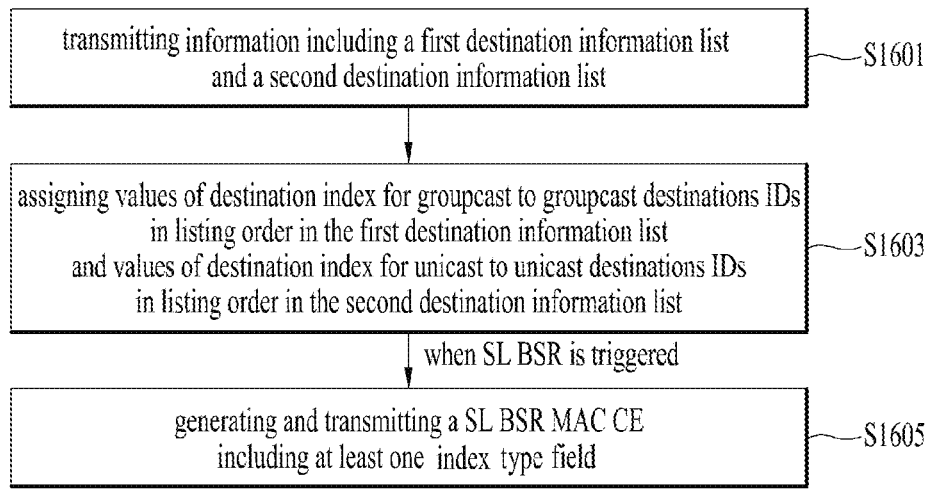
FIG. 16 is a diagram for generating and transmitting a sidelink buffer status reporting in a D2D communication system according to embodiments of the present invention.
FIG. 17 is an example for a new SL BSR MAC CE format in a D2D communication system according to embodiments of the present invention.

FIG. 16 is a diagram for generating and transmitting a sidelink buffer status reporting in a D2D communication system according to embodiments of the present invention.

The UE transmits information related to a first destination information list including at least one groupcast destination identifier (ID) and a second destination information list including at least one unicast destination ID via RRC message (S1601).

Preferably, the information related to a first destination information list and the second destination information is "destinationInfolist" in SidelinkUEInformation.

The information of "destinationInfoList" indicates the destination(s) for relay or non-relay related one-to-one or one-to-many sidelink communication. For one-to-one sidelink communication the destination is identified by the ProSe UE ID for unicast communication, while for one-tomany the destination it is identified by the ProSe Layer-2 Group ID as specified in TS 23.303.

The UE assigns values of destination index for groupcast to groupcast destinations IDs in listing order in the first destination information list and values of destination index for unicast to unicast destinations IDs in listing order in the second destination information list independently (1603).

The UE generates and transmits a SL BSR MAC CE including at least one index type indication indicating whether a corresponding destination index field refers to a unicast destination or a groupcast destination, when SL BSR is triggered (S1605).

Preferably, a total number of the groupcast destination IDs and the unicast destinations IDs is more than 16.

If a new SL BSR is introduced to extend the Group Index size, it is possible to include Index Type indication in the new SL BSR. The Index Type indication indicates whether the Group Index refers to the groupcast ID or unicast ID. The inclusion of Index Type indicator means that groupcast ID and unicast ID can be mapped to different Group Index space, and thus there is no reason to define a new mapping rule to map the Group Index values for both groupcast IDs and unicast IDs. Each type of Group Index follows the legacy mapping rule, i.e. Group Index for groupcast are mapped to groupcast IDs in listing ordfer in destinationInfoList, and Group Index for unicast are mapped to unicast IDs in listing order in unicast-destinationInfoList.

Preferably, if an index type indication indicates that a destination index field refers a groupcast destination, a value of the destination index field is set to one of the values of destination index for groupcast. And if an index type indication indicates that a destination index field refers a unicast destination, a value of the destination index field is set to one of the values of destination index for unicast.

For example, if destinationInfoList contains {groupcast ID1, groupcast ID2} and unicast-destinationInfoList contains {unicast ID1, unicast ID2, unicast ID3}, then the mapping between Group Index and groupcast/unicast IDs are as follows: i) Index Type=groupcast, Group Index 0=groupcast ID1, ii) Index Type=groupcast, Group Index 1=groupcast ID2, iii) Index Type=unicast, Group Index 0=unicast ID1, iv) Index Type=unicast, Group Index 1=unicast ID2, v) Index Type=unicast, Group Index 2=unicast ID3.

Preferably, a LCID field indicates that the SL BSR MAC CE includes the at least one index type indication.

Preferably, the at least one unicast destination ID is identified by a Layer-2 ID for unicast communication, and the at least one groupcast destination ID is identified by the ProSe Layer-2 Group ID.

An example of new SL BSR format with Index Type indication is shown in FIG. 17.

Meanwhile, there are other options related to separate SL BSR for unicast.

If the size of group index is less than or equal to 16, our invention suggest an option A. This option means that the legacy SL BSR is used for groupcast, and a new SL BSR is used for unicast. The indication of the new SL BSR can be achieved by new LCID value or R bit in R/R/E/LCID MAC subheader. The format of the new SL BSR is same as the legacy one. The difference from the legacy SL BSR is that the Group Index values in the new SL BSR are mapped to unicast IDs rather than groupcast IDs, i.e. Group Index values are mapped to unicast IDs in listing order in unicast-destinationInfoList.

If the size of group index is more than or 16, our invention suggest an option B. This option is similar to the option A, a new SL BSR is used for unicast while the legacy SL BSR is used for groupcast. However, the format of the new SL BSR should be different from the legacy one because the size of Group Index should be extended. The format in FIG. 15 can also be an example of the new SL BSR format with Option B.

However, option A and option B are not good idea, because the separate SL BSR may require separate trigger/cancellation condition, separate timer handling, and separate construction method. The logical channel prioritization procedure is also impacted due to introduction of separate SL BSR for unicast.

In Rel-12, RAN2 have already experienced complex situation due to introduction of SL BSR. Lots of issues were identified in handling SL BSR together with Uu BSR, and RAN2 spent much time to resolve those issues. If we now introduce one more type of SL BSR, the situation would become more complex. Thus, we propose that separate SL BSR is not introduced for unicast, and use only one SL BSR for both groupcast and unicast.

If 16 values are sufficient, the embodiment of FIG. 14 can be used, i.e. only the mapping rule is changed to cover both groupcast ID and unicast ID.

If 16 values are not sufficient, a new SL BSR format needs to be introduced as FIG. 16. The embodiment of FIG. 16 has a good point because the Group Index for unicast is not impacted by addition/removal of groupcast ID.

However, we have to think about the impact when introducing a new SL BSR. Introducing a new SL BSR has big impacts on standardization, e.g. design of new format, modification of logical channel prioritization for new MAC CE, handling of truncated SL BSR, etc. Moreover, indication of a new SL BSR also needs to be discussed considering that not many LCID values are left and one of the R bit is already used for other purpose (i.e. L field extension in enhanced CA).

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the scope of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

What is claimed is:

1. A method for a user equipment (UE) operating in a wireless communication system, the method comprising:
   transmitting information related to a first destination information list including at least one groupcast destination identifier (ID) and a second destination information list including at least one unicast destination ID,
   wherein the first destination information list is included first rather than the second destination information list in the information;
   assigning, by the UE, destination index values, the assigning comprising:
      sequentially assigning destination index values to groupcast destination IDs in an order corresponding to a sequential order of the first destination information list; and
      sequentially assigning any destination index values not corresponding to the order of the first destination information list to unicast destination IDs in an order corresponding to a sequential order of the second destination information list;
   generating and transmitting a SideLink Buffer Status Reporting (SL BSR) Medium Access Control (MAC) Control Element (CE) including at least one destination index field identifying at least one destination, when a SL BSR is triggered,
   wherein one of the at least one destination index field has one to one correspondence to one of the assigned destination index values, and
   wherein the SL BSR MAC CE includes an amount of sidelink data to be transmitted by the UE via a sidelink.

2. The method according to claim 1, wherein the UE is a Proximity-based Services (ProSe) UE configured to perform transmission and reception with the at least one destination via the sidelink in accordance with at least one of the assigned destination index values.

3. The method according to claim 1, wherein a total number of the groupcast destination IDs and the unicast destinations IDs is less than or equal to 16.

4. The method according to claim 1, wherein a size of the destination index field is 4-bits.

5. The method according to claim 1, wherein the at least one unicast destination ID is identified by a Layer-2 ID for unicast communication, and the at least one groupcast destination ID is identified by the Proximity-based Services (ProSe) Layer-2 Group ID.

6. A User Equipment (UE) for operating in a wireless communication system, the UE comprising:
   a transceiver; and
   a processor operably coupled with the transceiver and configured to:
      transmit information related to a first destination information list including at least one groupcast destination identifier (ID) and a second destination information list including at least one unicast destination ID,
      wherein the first destination information list is included first rather than the second destination information list in the information;
      assign destination index values by:
         sequentially assigning destination index values to groupcast destination IDs in an order corresponding to a sequential order of the first destination information list; and
         sequentially assigning any destination index values not corresponding to the order of the first destination information list to unicast destination IDs in an order corresponding to a sequential order of the second destination information list;
      generate and transmit a SideLink Buffer Status Reporting (SL BSR) Medium Access Control (MAC) Control Element (CE) including at least one destination index field identifying at least one destination, when a SL BSR is triggered,
      wherein one of the at least one destination index field has one to one correspondence to one of the assigned destination index values, and
      wherein the SL BSR MAC CE includes an amount of sidelink data to be transmitted by the UE via a sidelink.

7. The UE according to claim 6, wherein the UE is a Proximity-based Services (ProSe) UE configured to perform transmission and reception via a sidelink with the at least one destination via the sidelink in accordance with at least one of the assigned destination index values.

8. The UE according to claim 6, wherein a total number of the groupcast destination IDs and the unicast destinations IDs is less than or equal to 16.

9. The UE according to claim 6, wherein a size of the destination index field is 4-bits.

10. The UE according to claim 6, wherein the at least one unicast destination ID is identified by a Layer-2 ID for unicast communication, and the at least one groupcast destination ID is identified by the Proximity-based Services (ProSe) Layer-2 Group ID.

11. The method of claim 1, wherein the sequentially assigning destination index values to the groupcast destination IDs comprises matching a lowest destination index value to a first groupcast destination ID in the first destination information list.

12. The method of claim 1, wherein the sequentially assigning any destination index values not corresponding to the order of the first destination information list comprises matching a lowest unassigned destination index value to a first unicast destination ID in the second destination information list.

13. The UE of claim 6, wherein the sequentially assigning destination index values to the groupcast destination IDs comprises matching a lowest destination index value to a first groupcast destination ID in the first destination information list.

14. The UE of claim 6, wherein the sequentially assigning any destination index values not corresponding to the order of the first destination information list comprises matching a lowest unassigned destination index value to a first unicast destination ID in the second destination information list.

* * * * *